(12) United States Patent  (10) Patent No.: US 7,541,779 B2
Takenaka  (45) Date of Patent: Jun. 2, 2009

(54) PORTABLE ELECTRONIC DEVICE AND MOBILE COMMUNICATION TERMINAL

(75) Inventor: Hidetoshi Takenaka, Saitama (JP)

(73) Assignee: NEC Corporation, Tokyo (JP)

( * ) Notice: Subject to any disclaimer, the term of this patent is extended or adjusted under 35 U.S.C. 154(b) by 42 days.

(21) Appl. No.: 11/111,804

(22) Filed: Apr. 22, 2005

(65) Prior Publication Data

US 2005/0237030 A1 Oct. 27, 2005

(30) Foreign Application Priority Data

Apr. 22, 2004 (JP) ............................. 2004-126399

(51) Int. Cl.
H02J 7/04 (2006.01)
H02J 7/16 (2006.01)
(52) U.S. Cl. ...................... 320/150; 320/114
(58) Field of Classification Search ................. 320/150, 320/114–115, 152
See application file for complete search history.

(56) References Cited

U.S. PATENT DOCUMENTS

| | | | |
|---|---|---|---|
| 5,677,944 A * | 10/1997 | Yamamoto et al. | 455/573 |
| 5,717,314 A * | 2/1998 | Wakefield | 320/150 |
| 6,286,109 B1 * | 9/2001 | Pirdy | 713/340 |
| 6,777,915 B2 * | 8/2004 | Yoshizawa et al. | 320/137 |

FOREIGN PATENT DOCUMENTS

| | | |
|---|---|---|
| GB | 2 262 401 | 6/1993 |
| GB | 2 292 051 | 2/1996 |
| GB | 2 347 565 | 9/2000 |
| JP | 62-95934 | 5/1987 |
| JP | 09-130456 | 5/1997 |
| JP | 2000-032684 | 1/2000 |
| JP | 2000-194456 | 7/2000 |
| JP | 2001-145274 | 5/2001 |
| JP | 2001-258173 | 9/2001 |
| JP | 2002218026 A * | 8/2002 |

OTHER PUBLICATIONS

Machine Translation for JP 2002218026 A.*

* cited by examiner

Primary Examiner—Akm E Ullah
Assistant Examiner—Ramy Ramadan
(74) Attorney, Agent, or Firm—Young & Thompson (57) ABSTRACT

A portable electronic device and a mobile communication terminal, whose surface temperature does not increase while being charged regardless of the type of a charger for charging a storage battery being mounted therein. When a cell-phone unit, which has a radio section being a heat source and operates with a battery pack mounted therein as a power source, is connected to an external power feeder with the battery pack being mounted, the battery pack is charged by current from the external power feeder. When the battery pack is charged while the radio section is operating, the value of the charging current to charge the battery pack is reduced less than that when the radio section is not operating.

16 Claims, 8 Drawing Sheets

PORTABLE ELECTRONIC DEVICE AND MOBILE COMMUNICATION TERMINAL

BACKGROUND OF THE INVENTION

1. Field of the Invention

The present invention relates to a portable electronic device and a mobile communication terminal, whose surfaces do not reach a high temperature even when a user uses them while charging.

2. Description of the Prior Art

In recent years, a mobile communication terminal, an electronic databook and a PDA (Personal Digital Assistant) have been in common use as portable electronic devices. The smaller, the thinner and the lighter a portable electronic device becomes, the lower the thermal resistance. (spatial distance) between heat sources built in its body or housing (such as a speaker, an image pickup device, a storage battery being charged, or a charging circuit) and the surfaces of the housing becomes. Therefore, circuit operation tends to produce an increase in the surface temperature of a housing. In other words, in a smaller, thinner and lighter mobile communication terminal, heat produced by the built-in heat source is easily conducted to the housing, which increases the surface temperature of the housing.

Among the heat sources of a mobile communication terminal, "a charging circuit charging a storage battery" produces a lot of heat while the mobile communication terminal is in communicating state. While a mobile communication terminal is being used for communication, the terminal is often held very close to user's face. When a user uses (communicates with) the terminal while charging, the surface temperature of the housing may become so high that the user feels uncomfortable.

The Japanese Patent Application laid-open number 62-95934 discloses a "charging method" for restraining an increase in the surface temperature of the housing of a mobile communication terminal. According to the conventional charging method, the charging current is decreased while a radio device is in use to avoid a higher capacity power source and realize a smaller battery charger.

However, in the conventional charging method, the radio device (mobile communication terminal) does not have a charging circuit. In other words, the conventional charging method is not aimed at avoiding heat generation in a portable electronic device having a charging circuit.

More specifically, in the conventional charging method described above, a charger controls a switch in the radio device. In this construction, the radio device needs a dedicated charger paired with it. Consequently, if the dedicated charger is not available, as for example, when a user needs to charge a battery/the radio device at the place where he or she has gone, such problem arises as the charging current does not decrease and the heat generation in a battery cannot be avoided. With a portable electronic device typified by a mobile communication terminal, a user sometimes has to borrow a charger of someone at the place where the user travels or goes on a business trip. Therefore, it is inconvenient that the desired effect cannot be achieved without such a dedicated charger.

Further, the patent application discloses a diagram showing the structure in which both a power source and a battery feed power to a radio section, but the output voltage of the power source and the battery voltage are not the same (output voltage of the power source>battery voltage). Further, the battery voltage varies depending on how much the battery is charged. Actually, because the radio section needs a regulator (not shown) between the power source and the battery, the circuit necessarily becomes larger and more complicated. Such an increase in the size and complexity of the circuit prevents the realization of a smaller and lighter electronic device, and is thus undesirable for a portable electronic device. Moreover, because the heat produced by the regulator contributes a rise in the surface temperature of the housing, it is difficult to achieve the prevention of the temperature rise of a terminal.

As above, there has been proposed neither a portable electronic device nor a mobile communication terminal having a charging circuit and preventing the surface temperature rise of a housing while being charged.

SUMMARY OF THE INVENTION

It is therefore an object of the present invention to provide a portable electronic device and a mobile communication terminal having a charging circuit, capable of preventing the surface temperature rise of housings thereof while being charged.

To achieve the object mentioned above, according to the first aspect of the present invention, there is provided a portable electronic device having at least one electronic device being a heat source, which operates with a storage battery mounted therein as a power source, wherein, when the portable electronic device is connected to an external power source with the storage battery being mounted therein, the storage battery is charged by current from the external power source, and when the storage battery is charged while any of heat sources are operating, the value of the charging current to charge the storage battery is reduced less than that when no heat source is operating.

Preferably, in the first aspect, the portable electronic device further comprises a resistor for detecting the current supplied from the external device, wherein the resistance value of the resistor is switchable between at least two values, and the value of the charging current is changed depending on the voltage drop in the resistor.

Preferably, in the respective structures of the first aspect, the portable electronic device further comprises a temperature sensor, wherein only in the case that the temperature detected by the temperature sensor is equal to or higher than a designated value, the charging current when any of the heat sources are operating is reduced less than that when no heat source is operating, and the temperature sensor is located in the vicinity of the heat source.

In the second aspect of the present invention, there is provided a mobile communication terminal which operates with a storage battery mounted therein as a power source, wherein when the mobile communication terminal is connected to an external power source with the storage battery being mounted therein, the storage battery is charged by current from the external power source, and when the mobile communication terminal is in communicating state, the value of the charging current to charge the storage battery is reduced less than that when the terminal is not in communicating state.

Preferably, in the second aspect, the mobile communication terminal further comprises a resistor for detecting the current supplied from the external device, wherein the resistance value of the resistor is switchable between at least two values, and the value of the charging current is changed depending on the voltage drop in the resistor.

Preferably, in the respective structures of the second aspect, the mobile communication terminal further comprises a temperature sensor, wherein only in the case that the temperature detected by the temperature sensor is equal to or higher than a designated value, the charging current when the mobile communication terminal is in communicating state is reduced less than that when the terminal is not in communicating state, and the temperature sensor is located in the vicinity of a communicating section for transmitting and receiving mobile communication signals.

BRIEF DESCRIPTION OF THE DRAWINGS

The above and further objects and novel features of the invention will be more fully understood from the following detailed description when the same is read in connection with the accompanying drawings in which.

DETAILED DESCRIPTION OF THE PREFERRED EMBODIMENTS

A description will be given of the first embodiment of the present invention.

Figure 1:
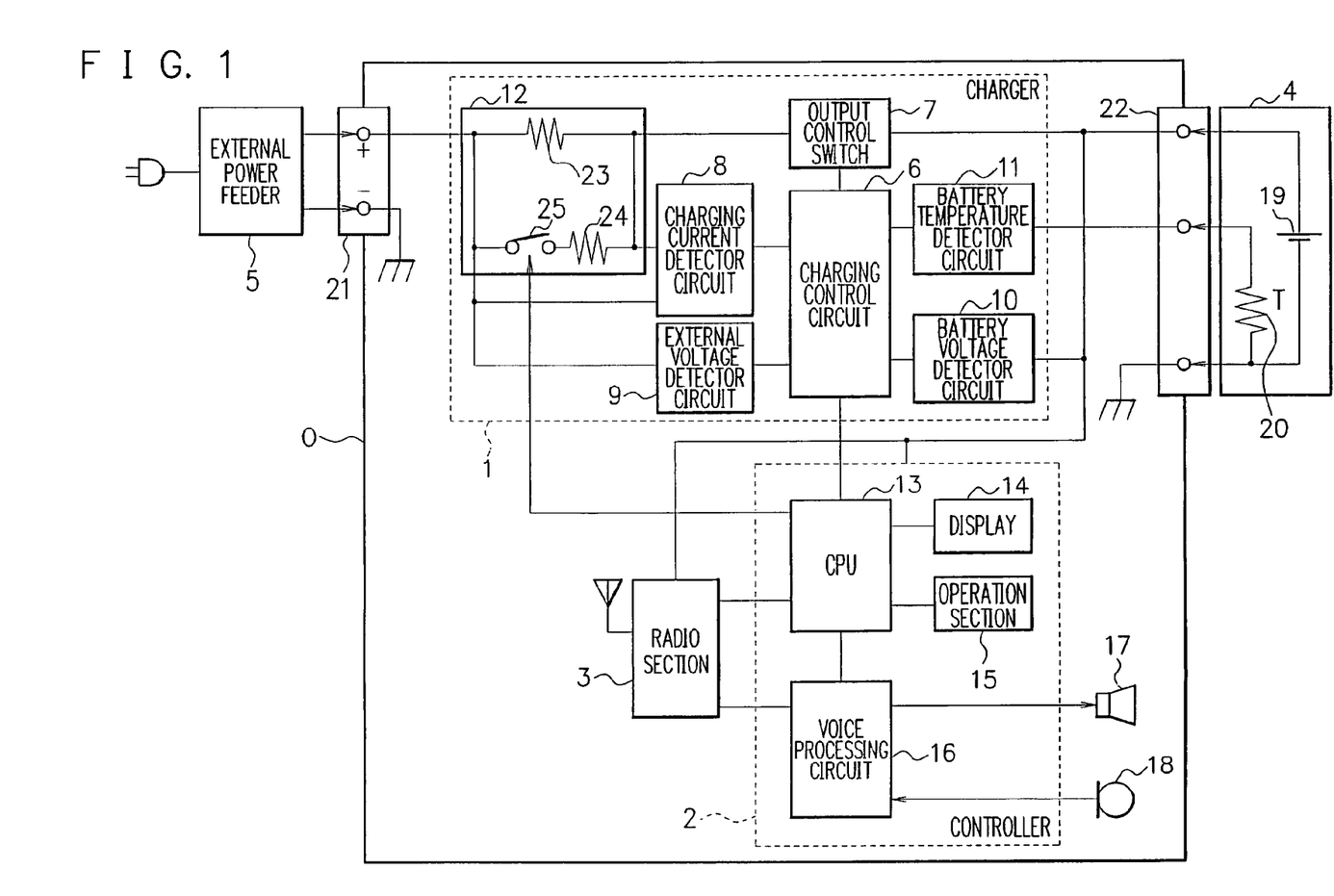
FIG. 1 is a diagram showing the structure of a cell-phone unit according to the first embodiment of the present invention.

FIG. 1 is a diagram showing the structure of a cell-phone unit according to the first embodiment. The cell-phone unit comprises a main body 0, a charger 1, a controller 2 and a radio section 3.

The charger 1 comprises a charging current detecting resistor 12, a charging current detector circuit 8, an external voltage detector circuit 9, an output control switch 7, a battery temperature detector circuit 11, a battery voltage detector circuit 10 and a charging control circuit 6.

The charging current detecting resistor 12 is connected to a charging terminal 21. The charging current detector circuit 8 is connected to both ends of the charging current detecting resister 12 to detect, based on the amount of voltage drop in the resister 12, whether or not the value of the current flowing through the resistor 12 is equal to or larger than a threshold value. The external voltage detector circuit 9 is connected to the charging terminal 21. The output control switch 7 is connected to the charging current detecting resister 12 to control the output of the charger 1. The battery voltage detector circuit 10 is connected to an output terminal of the charger 1 to detect the battery voltage of a battery pack 4. The battery temperature detector circuit 11 is connected to a temperature detector 20 in the battery pack 4 through a battery terminal 22 to detect the temperature of the battery pack 4. The charging control circuit 6 is connected to the charging current detector circuit 8, the external voltage detector circuit 9, the battery voltage detector circuit 10, the output control switch 7 and the battery temperature detector circuit 11 to control the output control switch 7 based on detection results obtained by the respective detector circuits.

The output of the charger 1 is supplied to the controller 2 and the radio section 3 as a power source and also supplied to the battery pack 4 through the battery terminal 22.

The charging current detecting resistor 12 comprises a resistor 24, a switch 25 connected in series to the resistor 24, and a resistor 23 connected in parallel to the resistor 24 and the switch 25. A CPU (Central Processing Unit) 13 controls the switch 25 so that the switch 25 is off when the radio section 3 is in communicating state, and the switch is on when the radio section 3 is under suspension (not in communicating state).

The controller 2 comprises a display 14, an operation section 15, a voice processing circuit 16, and the CPU 13. The display 14 is a functional section to provide visual information to a user. The operation section 15 is an interface for the user to operate the cell-phone unit. The voice processing circuit 16 is connected to the radio section 3, a speaker 17, and a microphone 18 to modulate and demodulate audio signals. The CPU 13 is connected to the display 14, the operation section 15, the voice processing circuit 16, the radio section 3, the charging control circuit 6, and the switch 25 to control the respective sections and detect the state of the respective sections.

The battery pack 4 comprises a cell 19 and the temperature detector 20. The cell 19 is a member for storing and discharging electric charge. The temperature detector 20 detects the temperature of the battery pack 4.

An external power feeder 5 is connected to the charger 1 via the charging terminal 21 exposed outside the main body 0, and provides current supplied by a commercial power source or an in-vehicle power source to the charger 1 after converting it to stable direct-current.

Figure 2:
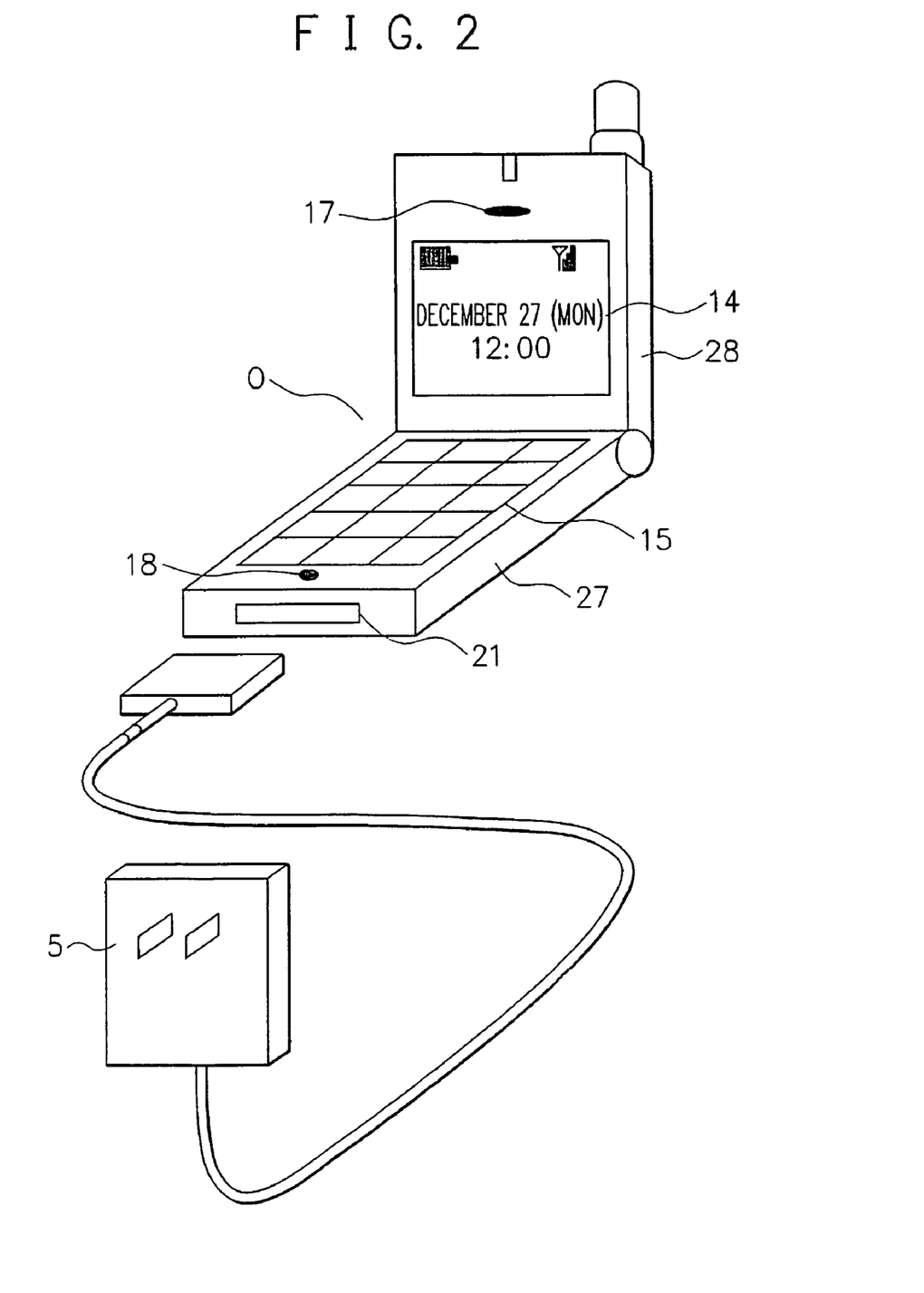
FIG. 2 is a diagram showing the external view of a cell-phone unit.

FIG. 2 is a diagram showing the external view of the cell-phone unit. The main body 0 comprises an upper housing 28 and a lower housing 27. The upper housing 28 is provided with the display 14 and the speaker 17, while the lower housing 27 is provided with the operation section 15, the microphone 18 and the charging terminal 21.

Figure 3:
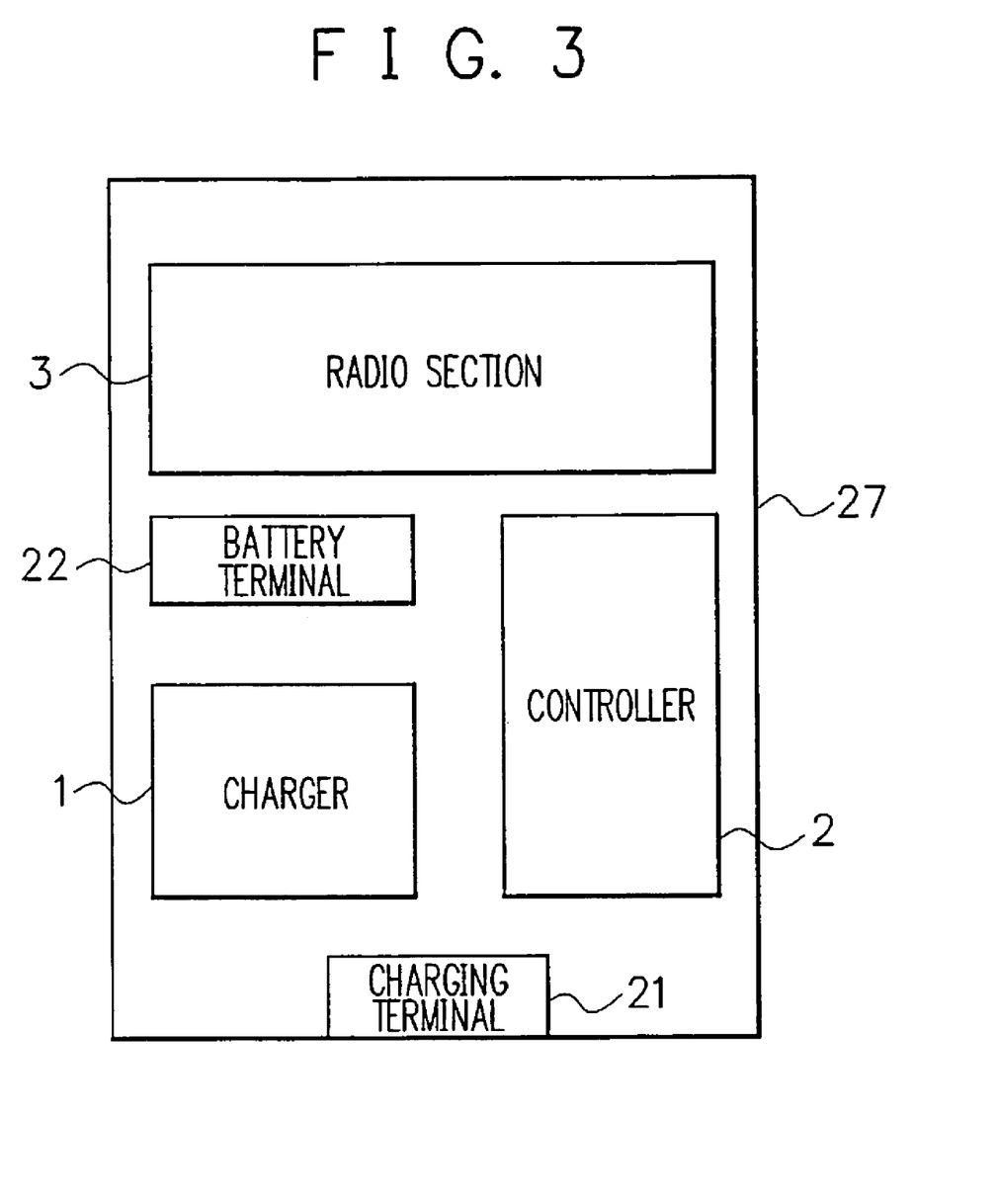
FIG. 3 is a diagram showing an example of the arrangement of operation sections in the lower housing of the cell-phone unit depicted in FIG. 2.

FIG. 3 is a diagram showing an example of the internal structure of the lower housing 27. In the lower housing 27, there are the radio section 3, the controller 2, the charger 1, and the battery terminal 22.

A description will be given of the operation of the cell-phone unit while being charged.

Figure 4:
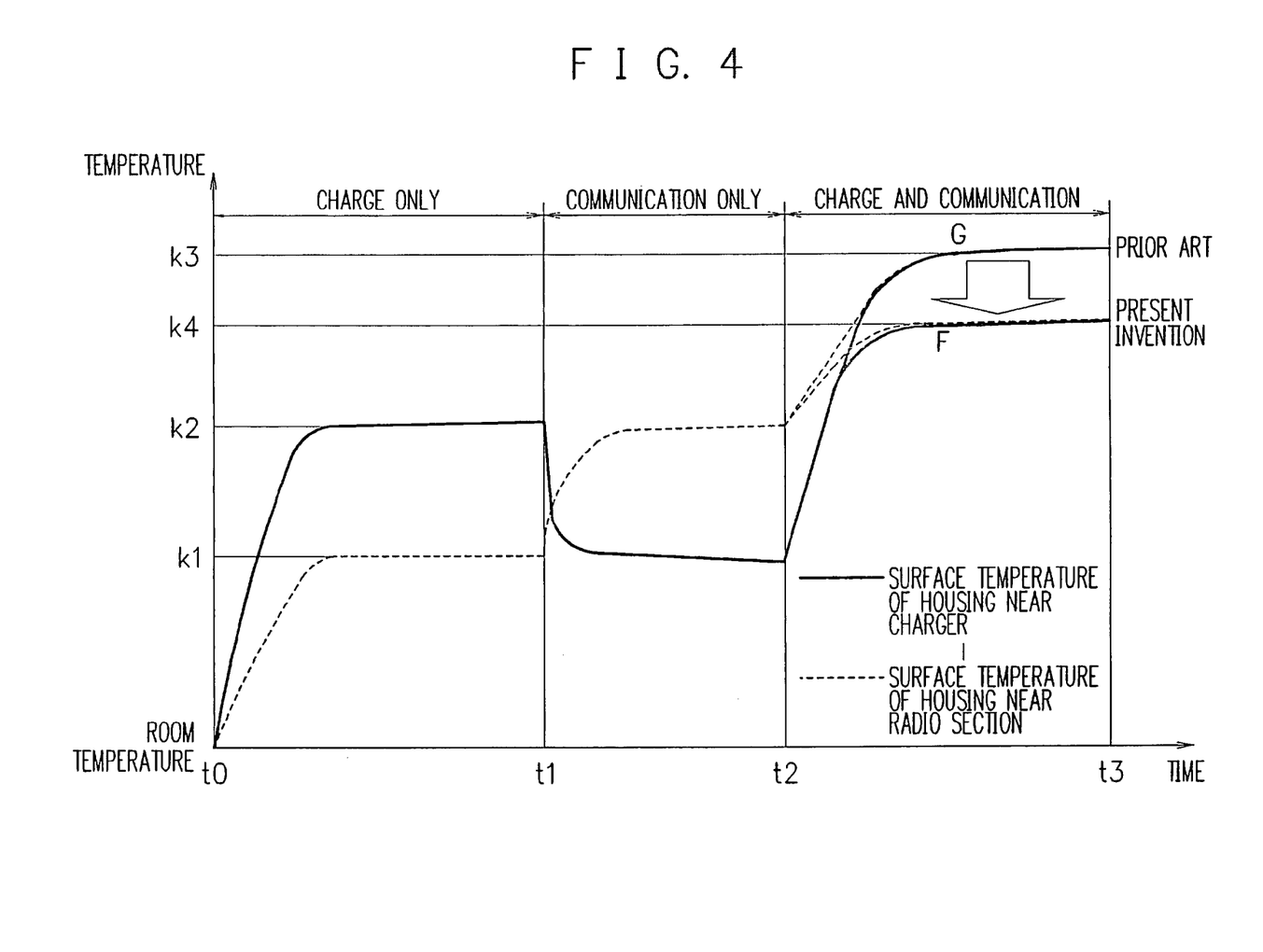
FIG. 4 is a graph showing changes in the surface temperatures of the housing of the cell-phone unit according to the first embodiment.

FIG. 4 is a graph showing changes in the surface temperatures of the housing of the cell-phone unit according to this embodiment. In FIG. 4, the surface temperatures of the housing of a conventional cell-phone unit are also shown for comparison. In the initial condition (time t0), it is assumed that the surface temperatures of the housings of both the cell-phone units are the same as the room temperature.

During the period from time t0 to t1, only the battery pack 4 is charged. When only the battery pack 4 is charged, the external power feeder 5 is connected to the charging terminal 21 to charge the battery pack 4 through the charger 1. In this time, the radio section 3 is under suspension (not in communicating state), and the switch 25 is on under the control of the CPU 13.

After the battery pack 4 starts being charged, the heat produced by the charger 1 is conducted to the housing, and the surface temperature of the housing in the vicinity of the charger 1 reaches k2, and then the surface temperature of the housing in the vicinity of the radio section 3 reaches k1.

In the period from time t1 to t2, only the communication is being carried out. Only for conversation, the external power feeder 5 is not connected to the charging terminal 21 and the charger 1 is under suspension. Besides, the radio section 3 is in communicating state, and the switch 25 is off under the control of the CPU 13.

In this state, by the heat generated in the radio section being in communicating state, the temperature of the lower housing 27 in the vicinity of the radio section 3 reaches k2. While the surface temperature of the housing in the vicinity of the charger 1 becomes lower than that when the battery pack 4 is being charged, because of the heat conducted from the radio section 3, it does not lower to the room temperature, thus staying at k1.

In the period from time t2 to t3, the charging of the battery pack 4 is performed simultaneously with communication. When the battery pack 4 is being charged during communication, the external power feeder 5 is connected to the charging terminal 21, and the radio section 3 is in communicating state. Also, the switch 25 is off under the control of the CPU 13.

In this state, because the surface temperatures of the lower housing 27 in the vicinity of the charger 1 and the radio section 3 mutually reinforce each other by their heat conduction, the temperatures become higher than those when the charger 1 or the radio section 3 operates independently.

The surface temperature of the housing is determined by the heat value of a heat source and the thermal resistance from a heat source to the housing surface. The main heat sources of the charger 1 are the charging current detecting resistor 12 and the output control switch 7 (the definition of the thermal resistance does not directly relate to the present invention, and therefore, description thereof is omitted here). The heat source of the radio section 3 is in the transmitter, and the heat value is mainly determined by its output electric power.

When a charging current passes through the charging current detecting resister 12, the charging current detector circuit 8 detects that the amount of voltage drop in the resister 12 is not less than a prescribed threshold value. The charging control circuit 6 controls the output control switch 7 to maintain the amount of voltage drop constant. In other words, the charging control circuit 6 controls the charging current so that it is maintained constant as a predetermined current (I chg). Incidentally, I chg is generally around C [mA], provided the capacity of the battery pack 4 is C [mAh].

The heat value of the charging current detecting resister 12 can be expressed as follows:

$$R\ chg \times I\ chg^2 [W] \quad (1)$$

and the heat value of the output control switch 7 is expressed as follows:

$$(V\ chg - R\ chg \times I\ chg - V\ batt) \times I\ chg \div (V\ chg - V\ batt) \times I\ chg\ [W] \quad (2)$$

where R chg [Ω] indicates the resistance value of the charging current detecting resister 12, V chg [V] indicates the output voltage of the external power feeder 5, and V batt [V] indicates the voltage of the battery pack 4 (=output voltage of the charger 1).

As shown in the expressions (1) and (2), because the heat values of the charging current detecting resistor 12 and the output control switch 7 increase as I chg increases, it is possible to control the heat value by controlling the charging current (I chg).

Figure 5:
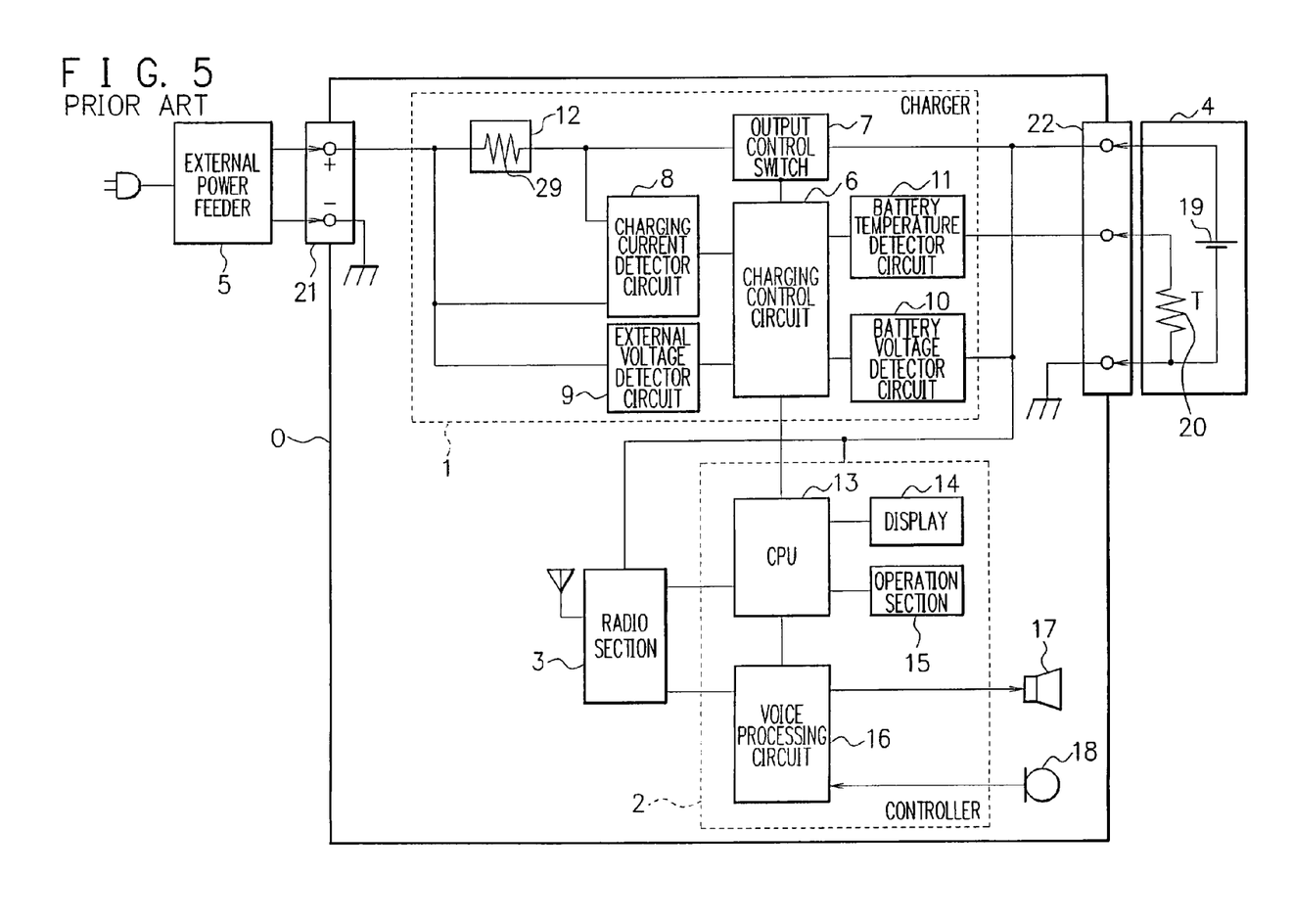
FIG. 5 is a diagram showing the structure of a conventional cell-phone unit.

FIG. 5 is a diagram showing the structure of a conventional cell-phone unit. In the conventional cell-phone unit, the structure of the charging current detecting resistor 12 is different from that according to this embodiment, and is provided with only a resistor 29. In other words, the charging current (I chg) of the conventional cell-phone unit is at a prescribed value C [mA] regardless of the condition of the terminal.

On the other hand, in the cell-phone unit according to this embodiment, the CPU 13 controls the switch 25 of the charging current detecting resistor 12 based on the state of the radio section 3 (in communication state or not). When the switch 25 is on (in conducting state), the combined resistance value of the resistor 23 and the resistor 24 is equal to that of the resistor 29 of the conventional cell-phone unit, and therefore, the charging current (I chg) is C [mA].

The resistance value R chg1 of the charging current detecting resistor 12 when the switch 25 is on can be expressed as follows:

$$R\ chg1 = R1 \times R2/(R1+R2) = (\frac{1}{2}) \times R1 = R3\ [\Omega] \quad (3)$$

where R1 [Ω] indicates the resistance value of the resistor 23, R2 [Ω] indicates the resistance value of the resister 24, and R3 [Ω] indicates the resistance value of the switch 25, and R1=R2 for the simplification of description.

When the switch 25 is off (in non-conducting state), the charging current (I chg) passes only through the resistance 23. In this time, the resistance value of the charging current detecting resistor 12, R chg2, is expressed as follows:

$$R\ chg2 = R1 = 2 \times R3 [\Omega] \quad (4)$$

As described above, in the cell-phone unit according to this embodiment, the charging current detector circuit 8 detects the amount of voltage drop of the charging current detecting resistor 12, and the charging control circuit 6 controls the output control switch 7 to maintain the amount of voltage drop constant. Therefore the charging current when the switch 25 is off (I chg2) can be expressed as follows:

$$R\ chg1 \times I\ chg = R\ chg2 \times I\ chg2(\frac{1}{2}) \times R1 \times C = R1 \times I\ chg2 I\ chg2 = \frac{1}{2} \times C \quad (5)$$

The above expression indicates that the charging current when the switch 25 is off (I chg2) is half compared to that when the switch 25 is on.

According to the expressions (1) to (5), when the switch 25 is off, the heat values of the charging current detecting resistor 12 and the output control switch 7 are half compared to that when the switch 25 is on.

As can be seen in FIG. 4, according to this embodiment, in the period from time t2 to t3, the surface temperature of the lower housing 27 of the cell-phone unit (indicated by "F" in FIG. 4) is lower compared to that of the conventional one (indicated by "G" in FIG. 4). That is, the surface temperature rise of the housing is prevented.

Incidentally, while the resistance value R1 of the resistor 23 and the resistance value R2 of the resistor 24 are the same for simplicity (R1=R2) in the above description, the values are not limited to this condition. The charging current I chg may be set to C [mA] when the resistance value of the charging current detecting resistor 12 is the combined resistance value of R1 and R2, and the charging current may be set to a value that can compensate the maximum power consumption in communication when the resistance value of the resister 12 is R1.

As above, in the cell-phone unit of this embodiment, the CPU 13 controls the switch of the charging current detecting resistor 12 based on the operation of the radio section 3 while the phone is being charged (the switch 25 is off when the radio section 3 is in communicating state, and on when the radio section 3 is under suspension) to reduce the heat value at the charger 1. Thereby, the surface temperature rise of the cell-phone unit can be controlled.

Incidentally, in the structure described above, because charging current is totally controlled in the cell-phone unit, the external power feeder 5 does not need a specific structure. In other words, although the external power feeder 5 needs to meet the specifications of the battery pack 4, a general charger can be used as the external power feeder 5.

According to this embodiment, it is possible to provide a cell-phone unit whose surface temperature rise can be controlled, and a user can use it safely while charging.

A description will be given of the second embodiment of the present invention.

Figure 6:
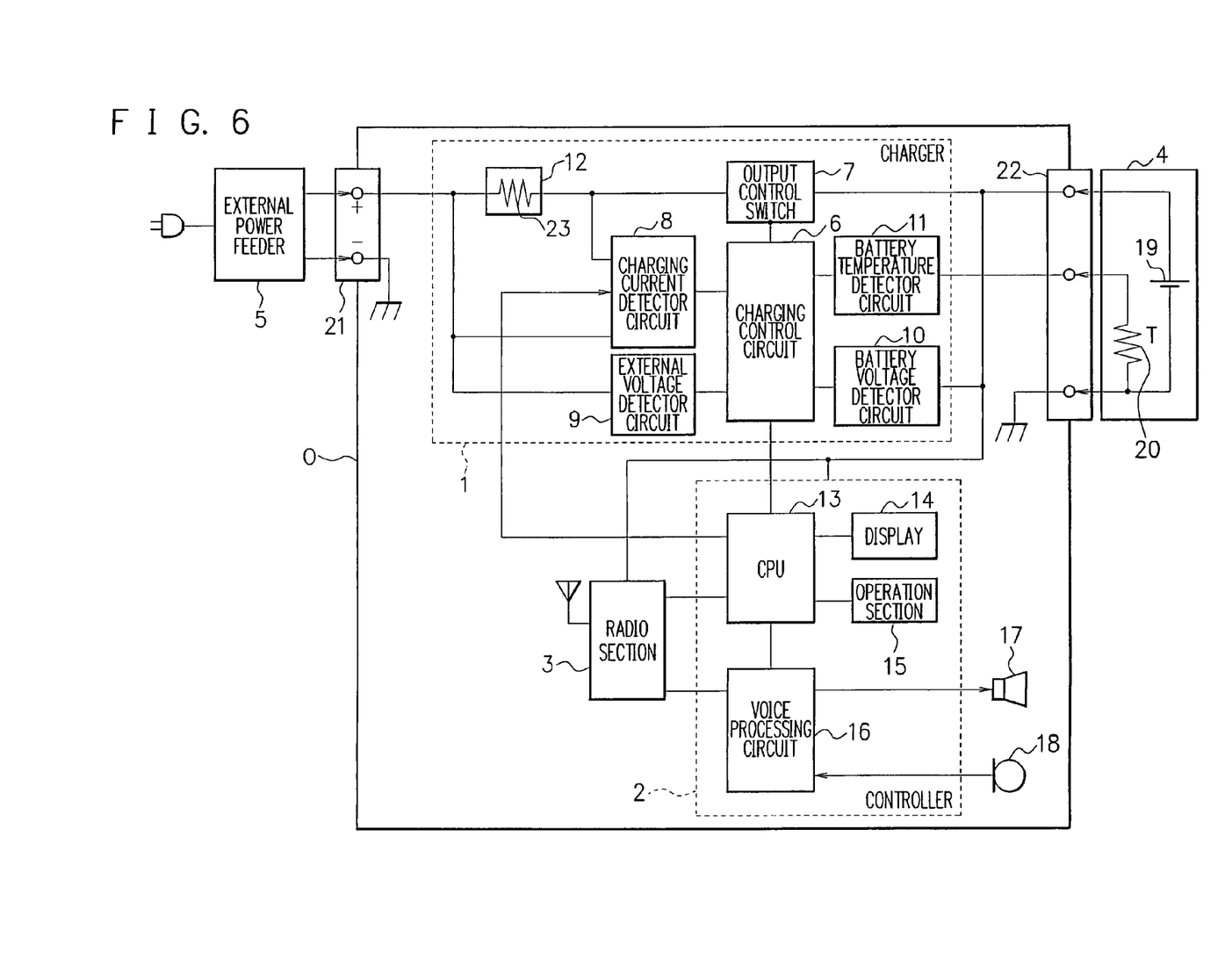
FIG. 6 is a diagram showing the structure of a cell-phone unit according to the second embodiment of the present invention.

FIG. 6 is a diagram showing the structure of a cell-phone unit according to this embodiment. The cell-phone unit of this embodiment has substantially the same construction as previously described for that of the first embodiment. In this embodiment, however, the charging current detecting resistor 12 is composed of the resistor 23 only.

In the first embodiment, the charging current detector circuit 8 detects whether or not the amount of voltage drop at the charging current detecting resistor 12 is equal to or larger than a threshold value. However, in this embodiment, there is provided a plurality of threshold values, and the charging current detector circuit 8 detects a range in which the amount of voltage drop falls.

The charging control circuit 6 receives, from the charging current detector circuit 8, information on which range the amount of voltage drop in the charging current detecting resistor 12 falls in, thereby controlling the output control switch 7 to control the value of the charging current based on the amount of voltage drop.

The operation of this embodiment is essentially the same as that of the first embodiment except that, in this embodiment, the charging current detector circuit 8 detects a range based on plural thresholds instead of on and off control over the switch 25 of the charging current detecting resistor 12. Therefore, the same description will not be repeated here.

A description will be given of the third embodiment of the present invention.

In the cell-phone unit according to the first embodiment, when the battery pack 4 is being charged and the radio section 3 is in communicating state, the charging current is always decreased to control the surface temperature rise of the housing. However, even in the case that the battery pack 4 is charged while the radio section 3 is in communicating state, when the surface temperature of the housing is not high, it is not necessary to decrease the charging current. If the charging current is always decreased while the battery pack 4 is being charged and the radio section 3 is in communicating state, excessive time is taken to charge the battery pack 4.

In this embodiment, a description will be given of a cell-phone unit in which the amount of charging current is changed depending on the surface temperature of a housing.

Figure 7:
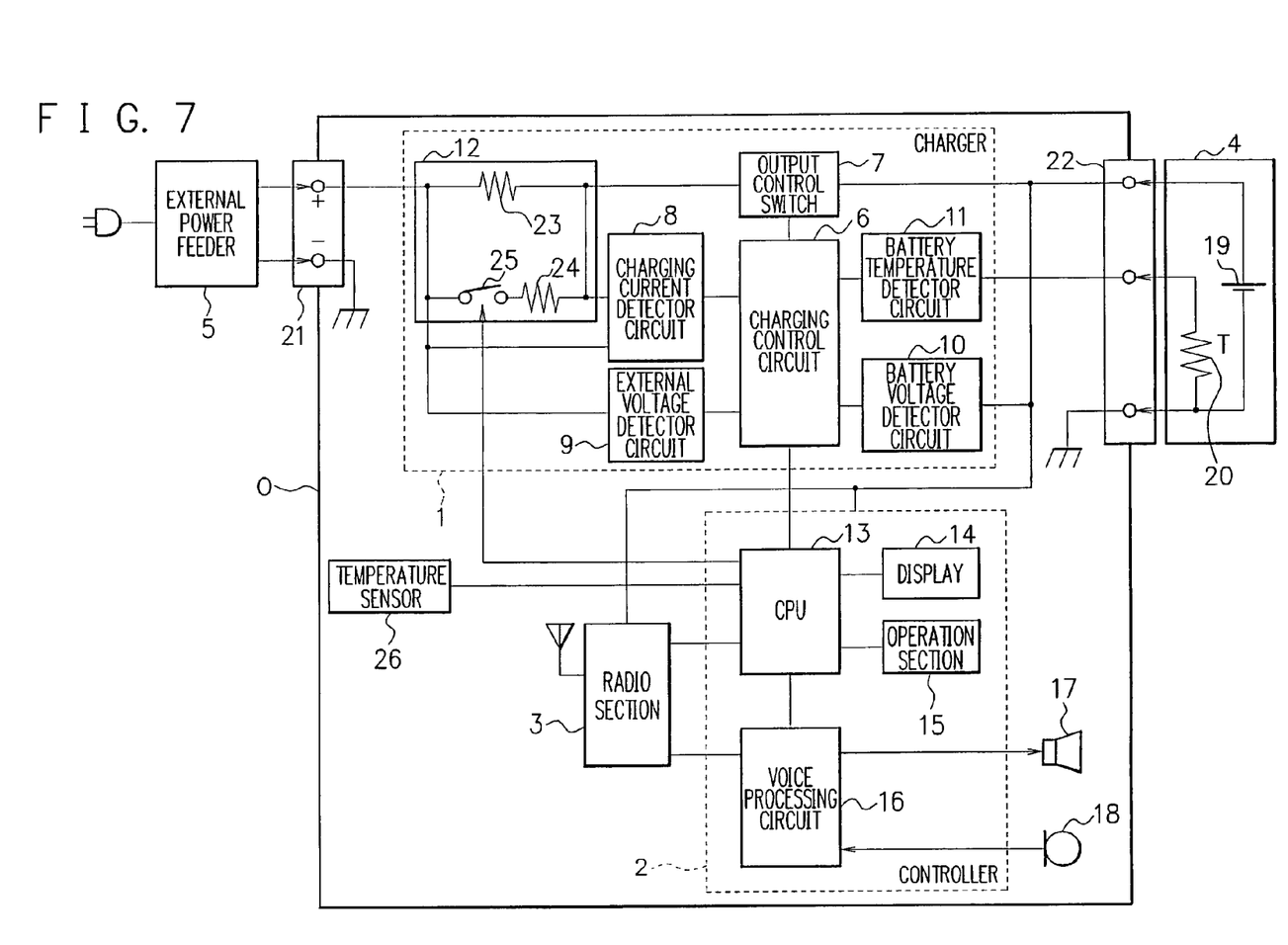
FIG. 7 is a diagram showing the structure of a cell-phone unit according to the third embodiment of the present invention.

FIG. 7 is a diagram showing the structure of a cell-phone unit according to this embodiment. The cell-phone unit of this embodiment is of substantially the same structure as that of the first embodiment, comprising the charger 1, the controller 2 and the radio section 3. In this embodiment, however, the cell-phone unit further comprises a temperature sensor 26.

The temperature sensor 26 measures the structure temperature of the housing. The temperature sensor 26 can be placed anywhere, however, preferably, placed in the vicinity of the radio section 3.

A description will be given of the operation of the cell-phone unit according to this embodiment.

The cell-phone unit of this embodiment operates in substantially the same manner as that of the first embodiment. In this embodiment, however, the CPU 13 does not change the current even if the battery pack 4 is being charged and the radio section 3 is in communicating state when the temperature sensor 26 informs the CPU 13 of the temperature less than a threshold value. The CPU 13 controls the output control switch 7 to change the charging current while the battery pack 4 is being charged and the radio section 3 is in communication state when the temperature sensor 26 informs the CPU 13 of the temperature not less than the threshold value.

Generally, the heat source of the radio section 3 is the transmitter, and its output power is power down controlled by the CPU 13 depending on the communicating or reception state in the radio section 3 (because low output is enough for transmitting radio signals when the radio section 3 receives radio signals adequately). Because the heat value of the radio section 3 is determined mainly by the power down control, when the output power of the transmitter is reduced, the heat value is also decreased. In other words, when the radio section 3 is operating with low output power (when transmitting weak radio signals), the surface temperature rise of the housing by the heat generated by the radio section 3 is small even if the radio section 3 is in communicating state.

The cell-phone unit of this embodiment, even if being charged and also in communicating state, does not reduce the charging current when the temperature of the housing is lower than a designated temperature. Thereby, the charging time is not prolonged.

As above, the cell-phone unit of this embodiment can be charged effectively in communicating state with low output power.

Figure 8:
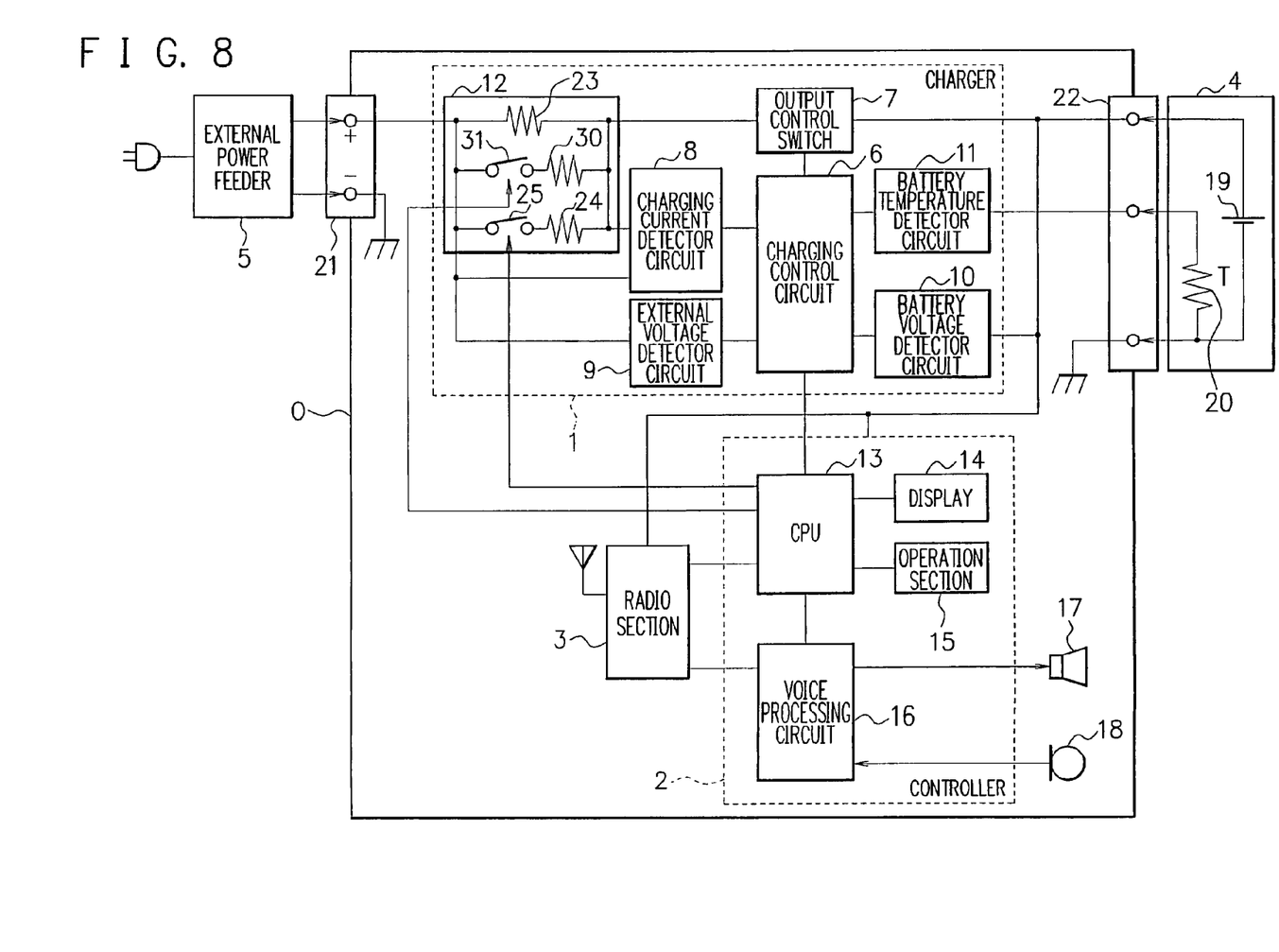
FIG. 8 is a diagram showing the structure of a cell-phone unit according to the fourth embodiment of the present invention.

A description will be given of the fourth embodiment of the present invention. FIG. 8 is a diagram showing the structure of a cell-phone unit according to this embodiment.

In the cell-phone unit of this embodiment, the charging current detecting resistor 12 comprises, in addition to a pair of the resistor 24 and the switch 25, a pair of a resistor 30 and a switch 31. The CPU 13 controls the combined resistance value of the charging current detecting resistor 12 as a 2-bit value.

As described in the third embodiment, the CPU 13 controls the output power of the transmitter of the radio section 3 in a plurality of stages. Because the lower output power causes the lower heat value of the radio section 3, it is possible to control safely and also effectively the charging of the cell-phone unit in communicating state by changing the charging current depending on the output power of the transmitter.

Here, while a description has been given, as an example, of the case that the CPU 13 controls the combined resistance as a value of 2 bits, it is also possible to control the combined resistance as a value of 3 or more bits by increasing the number of pairs of switches and resistors.

As set forth hereinabove, according to the present invention, it is possible to provide a portable electronic device and a mobile communication terminal each having a charging circuit, capable of preventing the surface temperature rise of its housing while being charged.

While the present invention has been described with reference to the particular preferred embodiments, it is not to be restricted by the embodiments.

For example, in the above embodiments, while a cell-phone unit is cited as an example of a portable electronic device, the present invention can be applied to other portable electronic devices than cell-phone units, and the terminal configuration is not limited to the folding type as shown in the examples described above.

Further, while a description has been given, as an example, of the case where a communicating section provides a heat source in the above embodiments, other electronic devices may be the heat source. Functions consuming a lot of electric power such as a camera or a speaker have been increasing recently, and the heat value in an electronic device implementing those functions has been also increasing. Thereby, it is also possible to control the surface temperature rise of a housing by changing the charging current depending on the operating state of an image pickup device instead of the radio section cited in the embodiments as a heat source.

As above, while preferred embodiments of the invention have been described using specific terms, the description has been for illustrative purpose only, and it is to be understood that changes and variations may be made without departing from the spirit or scope of the following claims.

What is claimed is:

1. A portable electronic device comprising at least one electronic component being a heat source, which operates with a storage battery mounted therein as a power source:
    wherein, when the portable electronic device is connected to an external power source with the storage battery being mounted therein, the storage battery is charged by current from the external power source;
    a charging current detector circuit bridging a resistor circuit detects the current supplied by the external power source, a heat value of the resistor circuit being known; and
    when the storage battery is charged while said at least one electronic component is operating, circuitry internal to said electronic device is enabled to change the value of the charging current to charge the storage battery to a value less than that when the storage battery is being charged and said at least one electronic component is not operating, wherein the heat value of the resistor circuit is expressed as follows:

$$R_{chg} \times I_{chg}^2 (W)$$

where Rchg is a resistance value of the resistor circuit and Ichg is the charging current,
    wherein the resistor circuit comprises:
    a first resistor connected in series to a switch; and
    a second resistor connected in parallel to the first resistor and the switch.

2. The portable electronic device claimed in claim 1,
    wherein the resistance value of the resistor circuit is switchable between at least two values; and
    the value of the charging current is changed depending on the voltage drop in the resistor circuit.

3. The portable electronic device claimed in claim 1, further comprising a temperature sensor, wherein only in the case that the temperature detected by the temperature sensor is equal to or higher than a designated value, the charging current when said at least one electronic component is operating is reduced less than that when said at least one electronic component is not operating.

4. The portable electronic device claimed in claim 2, further comprising a temperature sensor, wherein only in the case that the temperature detected by the temperature sensor is equal to or higher than a designated value, the charging current when said at least one electronic component is operating is reduced less than that when said at least one electronic component is not operating.

5. The portable electronic device claimed in claim 3, wherein the temperature sensor is located in the vicinity of said at least one electronic component.

6. The portable electronic device claimed in claim 4, wherein the temperature sensor is located in the vicinity of said at least one electronic component.

7. A mobile communication terminal which operates with a storage battery mounted therein as a power source:
    wherein, when the mobile communication terminal is connected to an external power source with the storage battery being mounted therein, the storage battery is charged by current from the external power source;
    a charging current detector circuit bridging a resistor circuit detects the current supplied by the external power source, a heat value of the resistor circuit being calculated known; and
    when the mobile communication terminal is in communicating state, circuitry internal to said mobile communication terminal is enabled to change the value of the charging current to charge the storage battery to a value less than that when the terminal is not in communicating state and said storage battery is being charged, wherein the heat value of the resistor circuit is expressed as follows:

$$R_{chg} \times I_{chg}^2 (W)$$

where Rchg is a resistance value of the resistor and Ichg is the charging current,
    wherein the resistor circuit comprises:
    a first resistor connected in series to a switch; and
    a second resistor connected in parallel to the first resistor and the switch.

8. The mobile communication terminal claimed in claim 7,
    wherein the resistance value of the resistor circuit is switchable between at least two values; and
    the value of the charging current is changed depending on the voltage drop in the resistor circuit.

9. The mobile communication terminal claimed in claim 7, further comprising a temperature sensor, wherein only in the case that the temperature detected by the temperature sensor is equal to or higher than a designated value, the charging current when the mobile communication terminal is in communicating state is reduced less than that when the terminal is not in communicating state.

10. The mobile communication terminal claimed in claim 8, further comprising a temperature sensor, wherein only in the case that the temperature detected by the temperature sensor is equal to or higher than a designated value, the charging current when the mobile communication terminal is in communicating state is reduced less than that when the terminal is not in communicating state.

11. The mobile communication terminal claimed in claim 9, wherein the temperature sensor is located in the vicinity of a communicating section for transmitting and receiving mobile communication signals.

12. The mobile communication terminal claimed in claim 10, wherein the temperature sensor is located in the vicinity of a communicating section for transmitting and receiving mobile communication signals.

13. The portable electronic device claimed in claim 1, wherein the charging current detector circuit is configured to detect whether or not an amount of voltage drop at the resistor circuit is equal to or larger than a threshold value.

14. The portable electronic device claimed in claim 1, wherein the charging current detector circuit is configured to detect whether or not an amount of voltage drop at the resistor circuit is equal to or larger than a plurality of threshold values, and the charging current detector circuit detects a range in which the amount of voltage drop falls.

15. The mobile communication terminal claimed in claim 7, wherein the charging current detector circuit is configured to detect whether or not an amount of voltage drop at the resistor circuit is equal to or larger than a threshold value.

16. The mobile communication terminal claimed in claim 7, wherein the charging current detector circuit is configured to detect whether or not an amount of voltage drop at the resistor circuit is equal to or larger than a plurality of threshold values, and the charging current detector circuit detects a range in which the amount of voltage drop falls.

* * * * *